(12) United States Patent
Chapman

(10) Patent No.: US 9,094,605 B2
(45) Date of Patent: Jul. 28, 2015

(54) STABILIZED CAMERA PLATFORM SYSTEM

(71) Applicant: Chapman/Leonard Studio Equipment, Inc., North Hollywood, CA (US)

(72) Inventor: Leonard T. Chapman, North Hollywood, CA (US)

(73) Assignee: Chapman/Leonard Studio Equipment, Inc, North Hollywood, CA (US)

( * ) Notice: Subject to any disclaimer, the term of this patent is extended or adjusted under 35 U.S.C. 154(b) by 0 days.

(21) Appl. No.: 13/928,198

(22) Filed: Jun. 26, 2013

(65) Prior Publication Data

US 2013/0286233 A1   Oct. 31, 2013

Related U.S. Application Data

(60) Continuation of application No. 13/406,353, filed on Feb. 27, 2012, now abandoned, which is a continuation of application No. 11/735,088, filed on Apr. 13, 2007, now Pat. No. 8,125,564, which is a division of application No. 10/654,848, filed on Sep. 4, 2003, now abandoned.

(51) Int. Cl.
| | |
|---|---|
| *H04N 5/225* | (2006.01) |
| *H04N 5/232* | (2006.01) |
| *B66F 11/04* | (2006.01) |
| *F16M 11/04* | (2006.01) |
| *F16M 11/10* | (2006.01) |
| *F16M 11/12* | (2006.01) |
| *F16M 11/18* | (2006.01) |
| *F16M 11/20* | (2006.01) |
| *F16M 11/24* | (2006.01) |
| *F16M 11/42* | (2006.01) |

(52) U.S. Cl.
CPC .......... *H04N 5/23248* (2013.01); *B66F 11/048* (2013.01); *F16M 11/04* (2013.01); *F16M 11/105* (2013.01); *F16M 11/12* (2013.01); *F16M 11/18* (2013.01); *F16M 11/2064* (2013.01); *F16M 11/2092* (2013.01); *F16M 11/24* (2013.01); *F16M 11/42* (2013.01); *H04N 5/23258* (2013.01); *H04N 5/23287* (2013.01); *F16M 2200/063* (2013.01)

(58) Field of Classification Search
CPC .......... H04N 5/23287; H04N 5/23248; H04N 5/23258; F16M 11/24
USPC .......... 248/276.1, 208.11, 281.11, 285.1, 585
See application file for complete search history.

(56) References Cited

U.S. PATENT DOCUMENTS

| | | | |
|---|---|---|---|
| 3,995,797 A | 12/1976 | Knight | |
| 4,548,373 A * | 10/1985 | Komura | 248/122.1 |
| 4,867,405 A * | 9/1989 | Nakamura | 248/281.11 |
| 5,218,876 A | 6/1993 | Lindsay | |
| 5,273,039 A * | 12/1993 | Fujiwara et al. | 600/407 |
| 5,816,552 A | 10/1998 | Chapman | |
| 5,940,645 A | 8/1999 | Bonin | |

(Continued)

*Primary Examiner* — Twyler Haskins
*Assistant Examiner* — Carramah J Quiett
(74) *Attorney, Agent, or Firm* — Kenneth H. Ohriner; Perkins Coie LLP

(57) ABSTRACT

A stabilized camera system has a roll frame formed as a parallelogram linkage and pivotably attached to a pan frame. A tilt frame is pivotably attached to the roll frame. Control circuits are provided to compensate for drift, to allow manual aiming of the camera during stabilized camera operation, and for providing rapid leveling. The stabilized camera system is compact with low moments of inertia to allow rapid movements.

3 Claims, 12 Drawing Sheets

(56) References Cited

U.S. PATENT DOCUMENTS

| | | |
|---|---|---|
| 6,109,626 A | 8/2000 | Chapman |
| 6,354,750 B1 * | 3/2002 | Romanoff ................... 396/428 |
| 6,471,165 B2 * | 10/2002 | Twisselmann ........... 248/123.11 |
| 7,137,747 B2 | 11/2006 | Chapman |
| 8,125,564 B2 | 2/2012 | Kozlov et al. |
| 2002/0001471 A1 * | 1/2002 | Chapman ................... 396/428 |
| 2002/0014562 A1 * | 2/2002 | Twisselmann ........... 248/123.11 |
| 2004/0178312 A1 * | 9/2004 | Parsons ................... 248/276.1 |

\* cited by examiner

STABILIZED CAMERA PLATFORM SYSTEM

PRIORITY CLAIM

This application is a Continuation of U.S. patent application Ser. No. 13/406,353, filed Feb. 27, 2012, and now abandoned, which is a Continuation of U.S. patent application Ser. No. 11/735,088, filed Apr. 13, 2007, now U.S. Pat. No. 8,125,564, which is a Divisional of U.S. patent application Ser. No. 10/654,848, filed Sep. 4, 2003, and now abandoned. These applications are incorporated herein by reference.

BACKGROUND OF THE INVENTION

The field of the invention is stabilized platforms and systems for cameras. More specifically, the invention relates to gyroscopic stabilization systems for motion picture and video cameras.

In motion picture, television or video filming or recording, the camera is often supported on a vehicle, to follow an action or moving sequence to achieve a desired camera angle or effect, or to film occupants in or on the vehicle. Various specialized camera cars, camera trucks, cranes, and dollys have been used for this purpose. In addition, specialized camera support systems have been used to mount cameras on aircraft such as airplanes and helicopters, and on watercraft, such as boats, floats, or buoys.

In filming or recording with motion picture or television or video cameras, it is important for the camera to be maintained in a stable position. In the most basic form, camera stability has been achieved by mounting the camera on a tri-pod. However, when the camera itself is mounted on and moves with a vehicle, maintaining camera stability often becomes difficult. For example, with a camera mounted on a camera car moving along a roadway and filming or recording a fixed subject on the ground, e.g., a building, or a subject which is also moving e.g., another moving vehicle, the camera and the lens of the camera will necessarily move in unintended and undesirable ways, due to various factors. These factors may include changes in the roadway direction or inclination, changes in the vehicle orientation, due to shifting gravitational or inertial loads, as well as for other reasons. Undesirable movement can be especially problematic when the camera is mounted on an aircraft, where movement readily occurs along three dimensions, and where wind buffeting of the camera can be extreme. The undesirable camera lens movement resulting from these factors reduces the quality of the filmed or recorded images, by causing the images to be improperly framed, or to appear jumpy or erratic.

Production time can be extremely expensive. Even relatively short, simple film or video sequences, such as a scene in a motion picture or television production, or a TV commercial, generally requires large numbers of film or video production professionals, such as directors, actors, camera crew, grips, lighting and sound personnel, prop, background set, make-up and wardrobe personnel, etc. Consequently, even the loss of one minute of production time can translate into hundreds or thousands of dollars in increased production costs. If special effects, stunts, large numbers of extras, animal actors, etc. are involved, costs can be even higher. Accordingly, any techniques that avoid delays in filming or re-shooting, are very advantageous.

To maintain the camera lens in a stable position in these types of situations, various camera stabilization systems have been proposed. Generally, these camera stabilization systems rely on gyrostabilization and feedback techniques which detect unintended or undesirable movement of the camera, and then compensate for that movement via motors driving the camera platform. The term gyrostabilization here means any camera movement compensation system using position, rate, or acceleration sensors, whether "gyroscopic" or of another type.

While these types of stabilization systems have been successfully used in the past, various disadvantages remain. The gimbal system used in existing stabilized camera systems, which allows the camera to pivot about three perpendicular directions, are often large and relatively time consuming or difficult to balance. This can restrict camera movement and positioning and also make transport, installation and set-up (including balancing) more difficult. Moreover, existing systems generally have large moments of inertia, making them relatively slower in responding to correction forces applied by the motors. Accordingly, there is a need for a camera stabilization system which is compact, lightweight, and agile in responding to correction signals and forces.

The camera operator, cinematographer, or director will often want to manually aim the camera, by simply grabbing the camera with the hands, and aiming it as desired. Existing camera stabilization systems, when turned on, will automatically resist such manual movement. While this resistance can be overcome by applying force sufficient to overcome the torque limits of the motors in the stabilization system, this results in jerky and imprecise camera movement. As a result, manually aiming or positioning of the camera by forcibly overriding stabilization system has disadvantages, and generally is almost never acceptable during filming. On the other hand, turning the stabilization system off to perform hand or manual camera aiming or movement results in loss of all stabilization functions. With the stabilization turned off, the only forces holding the camera in position are the frictional forces in the various rotation joints. Based on the weight of the camera and other factors, these frictional forces may be insufficient to even hold the camera at any desired position. In addition, due to static and dynamic friction characteristics, achieving smooth and accurate camera movement, even with the stabilization system turned off, can be difficult or impossible. Accordingly, there is a need for a camera stabilization system which allows for smooth and accurate manual aiming.

Over longer periods of time, drift in existing camera stabilization systems can cause the camera to become improperly positioned. The severity of drift varies with the accuracy of the sensors in the system. Due to drift, under certain conditions, the camera may require repositioning before filming or recording is continued after a lunch break or other pause. This can result in delays and added production costs. Accordingly, there is a need for a camera stabilization system which compensates for or eliminates drift.

Existing camera stabilization systems have various other disadvantages as well, relating to backlash in the drive systems, balancing, large moments of inertia, controls and accuracy of positioning. Accordingly, various engineering challenges remain in designing an improved camera stabilization system.

SUMMARY OF THE INVENTION

After extensive research and development, the various engineering challenges described above associated with stabilized camera systems have now been overcome in a new system providing significantly improved performance and advantages. These advantages include a compact design, precise positioning, and improved performance features and characteristics.

In a first aspect, a stabilized camera system includes a roll or dutch frame pivotably attached to a pan frame. The roll or dutch frame includes a parallelogram linkage. A tilt frame is pivotably attached to the parallelogram linkage of the roll frame. This results in a more compact and lightweight design. With this design, the camera system can also be more quickly and easily installed and balanced.

In a second aspect of the invention, a manual camera aiming mode provides electronically controllable fluid dampening head characteristics. Via electronic controls, the amount of dampening and inertia encountered during manual movement or aiming of the camera can be adjusted. This allows for smooth positioning or aiming of the camera by hand. It also allows the camera to be supported with fluid head-like characteristics.

In a third aspect of the invention, a camera stabilization system uses feedback from a position sensor on the camera platform to reduce or eliminate drift. As a result, even using sensors of moderate accuracy, drift can be virtually eliminated or reduced to acceptable levels.

In a fourth aspect of the invention, a dutch or roll axis control circuit provides a fast to horizon control mode, for rapidly moving the camera platform to horizontal. This feature allows the camera operator to rapidly confirm that the camera is level relative to the horizon or the "local horizon".

In a fifth aspect of the invention, first and second electric motors drive movement of pan, roll, and tilt frames or structures. This feature reduces backlash providing greater accuracy in control and positioning.

The invention resides as well in subcombinations and subsystems of the components, elements, and steps described. Additional objects, features and advantages will appear below. Accordingly, it is an object of the invention to provide an improved stabilized camera system.

BRIEF DESCRIPTION OF THE DRAWINGS

In the drawings, wherein the same element number indicates the same element in each of the views.

DETAILED OF DESCRIPTION OF THE DRAWINGS

Figure 1:
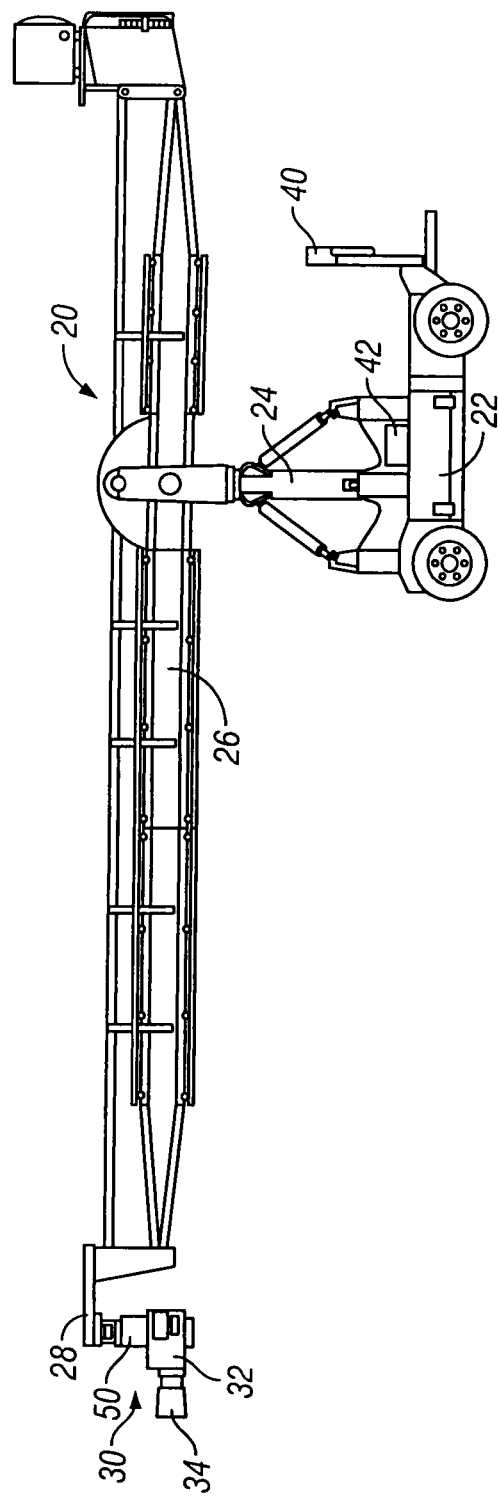
FIG. 1 is a side view of a camera and camera stabilization system mounted on a camera crane.

Turning now in detail to the drawings, as shown in FIG. 1, a camera 32 having a lens 34 is supported on a camera stabilization system 30 at the front end of an arm 26 of a camera crane 20. The camera crane arm 26 is pivotably supported on a mast 24 on a mobile base 22. FIG. 1 accordingly shows one example of the use of the camera stabilization system 30 with a camera 32. The stabilization system 30 may also be used on various other types of platforms or supports, including camera cars, camera trucks, camera dollys, aircraft, watercraft, and virtually any other vehicle, base or support where stabilization is desirable.

Gimbal Design

Figure 2:
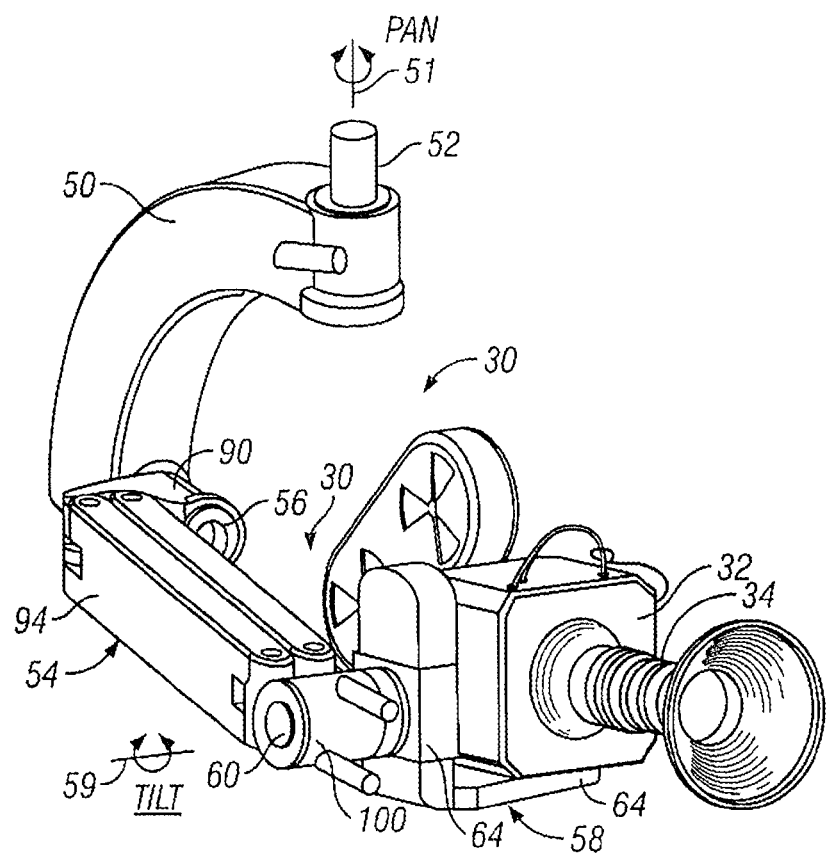
FIG. 2 is a front and left side perspective view of the camera system shown in FIG. 1.
Figure 3:
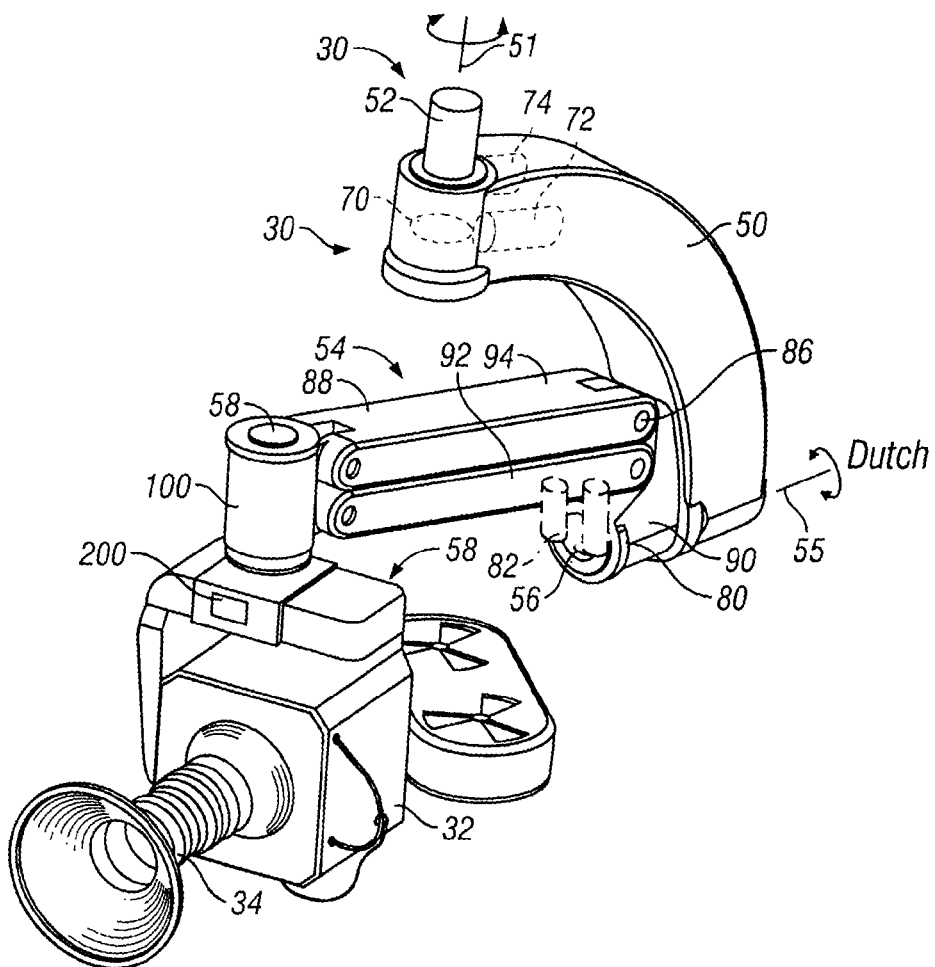
FIG. 3 is a front and right side perspective view thereof.

Turning now to FIGS. 2 and 3, the support system 30 includes a pan frame 50 preferably formed as a hollow arcuate or curved box section. A pan shaft 52 is rigidly attached (e.g., welded, bolted or pinned) to a front support plate 28 of the camera crane 20 or other support vehicle or structure. The pan frame 50 can pivot or rotate on the pan shaft 52 about a pan axis 51, as shown in FIG. 2.

Referring still to FIGS. 2 and 3, a dutch or roll frame 54 is attached to a roll collar 90 having a roll shaft 56 extending into the lower end of the pan frame 50. The roll frame 54 is pivotable or rotatable about a roll axis 55 shown in FIG. 3. The roll frame 54 preferably includes a parallelogram linkage 88 having first and second parallel links 92 and 94. The back ends of the links 92 and 94 are attached to the roll collar 90 with locking bolts 86. Similarly, the front ends of the roll links 92 and 94 are attached to a tilt collar 100 with locking bolts 86. The locking bolts 86 are loosened during balancing or set-up, to properly position the roll frame 54. The locking bolts 86 are then tightened, at four places, to provide a rigid connection between the roll collar 90 and the tilt collar 100. The roll frame 54 requires no other internal or external components, such as springs, dampeners, etc.

Figure 8:
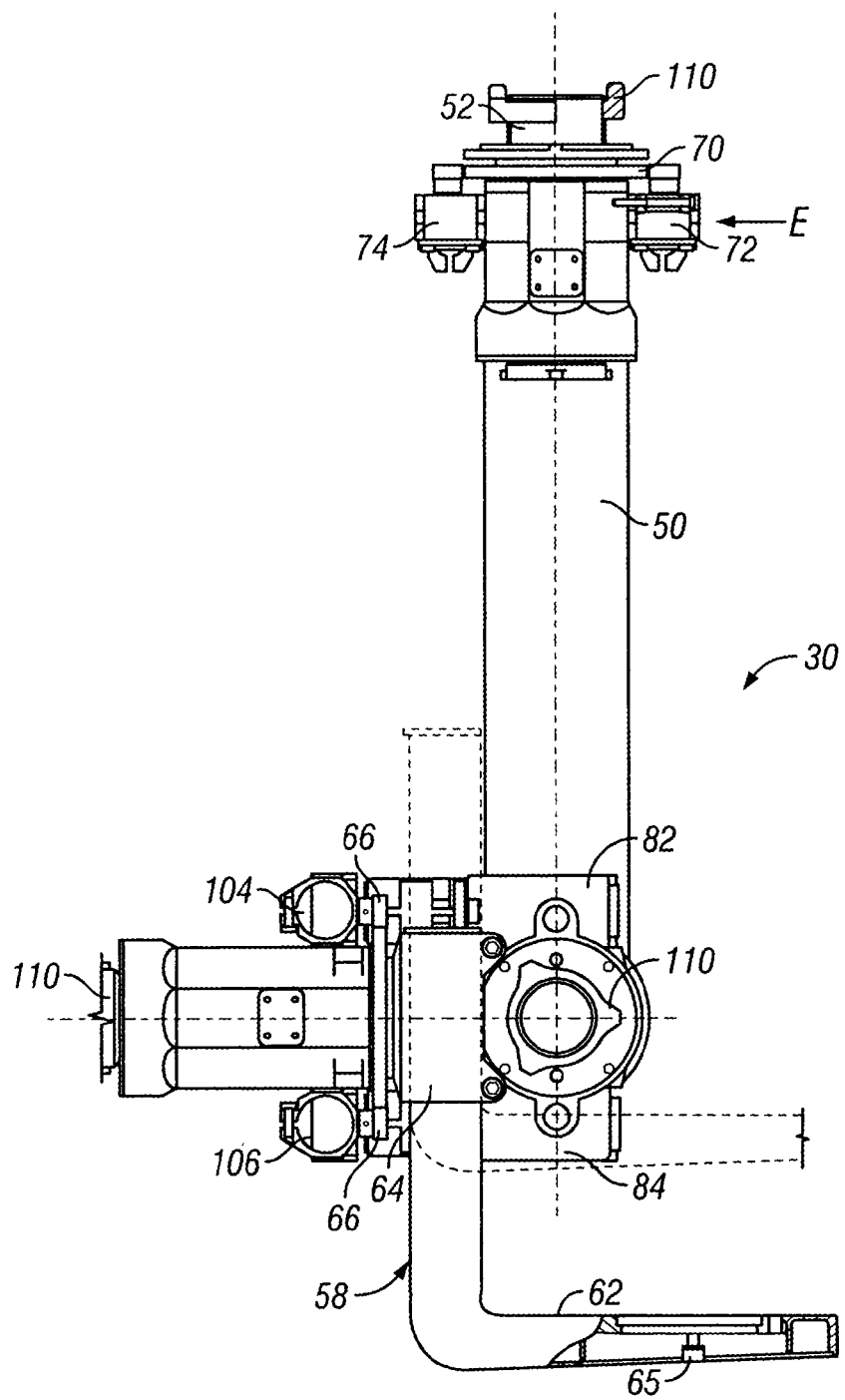
FIG. 8 is a front view thereof with the camera removed, for purpose of illustration.

Referring still to FIGS. 2 and 3, a tilt frame 58 has a tilt shaft 60 extending into the tilt collar 100. The tilt frame 58 is pivotable about a tilt axis 59, shown in FIG. 2. Referring to FIG. 2 and momentarily to FIG. 8, the tilt frame 58 includes an L-shaped camera platform 62. The camera 32 is secured onto the platform 62 via standard screws or bolts. The vertical leg of the camera platform 62, as shown in FIG. 8, extends through a sleeve 64 joined to the tilt collar 100. The vertical position of the camera platform 62 (and of the camera 32) can be adjusted by loosening sleeve bolts 66, vertically positioning the camera platform 62 as desired and then tightening the sleeve bolts 66.

Figure 4:
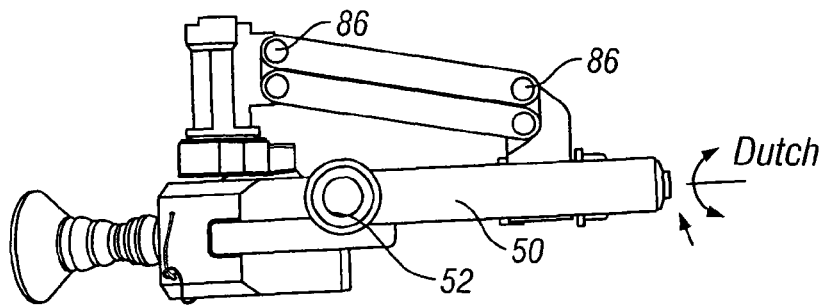
FIG. 4 is a plan view of the camera system shown in FIGS. 2 and 3.
Figure 5:
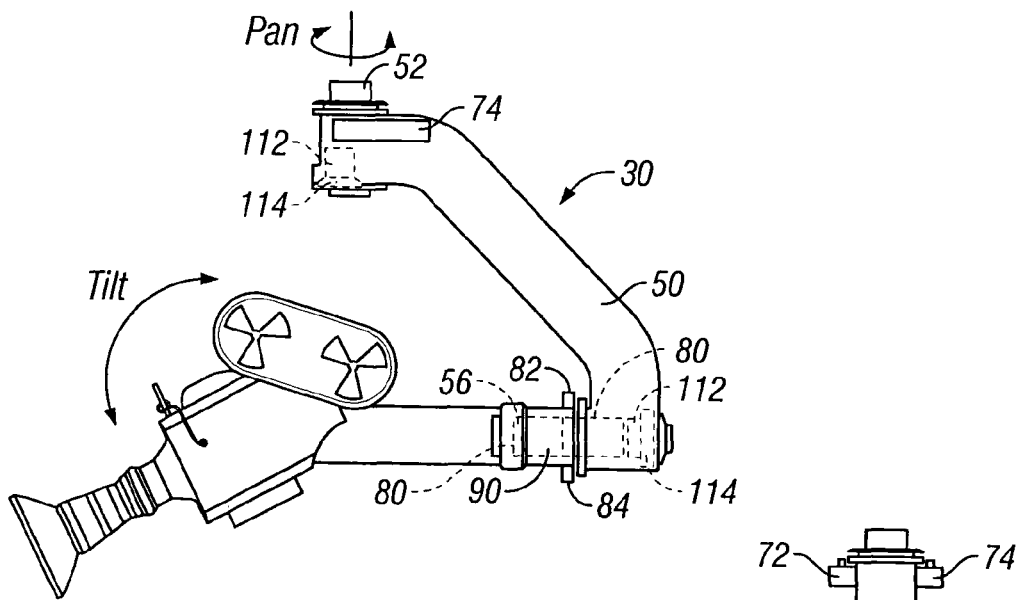
FIG. 5 is a left side elevation view thereof.
Figure 6:
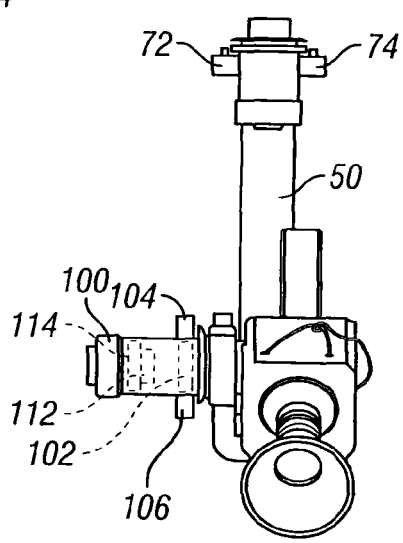
FIG. 6 is a front view thereof.
Figure 7:
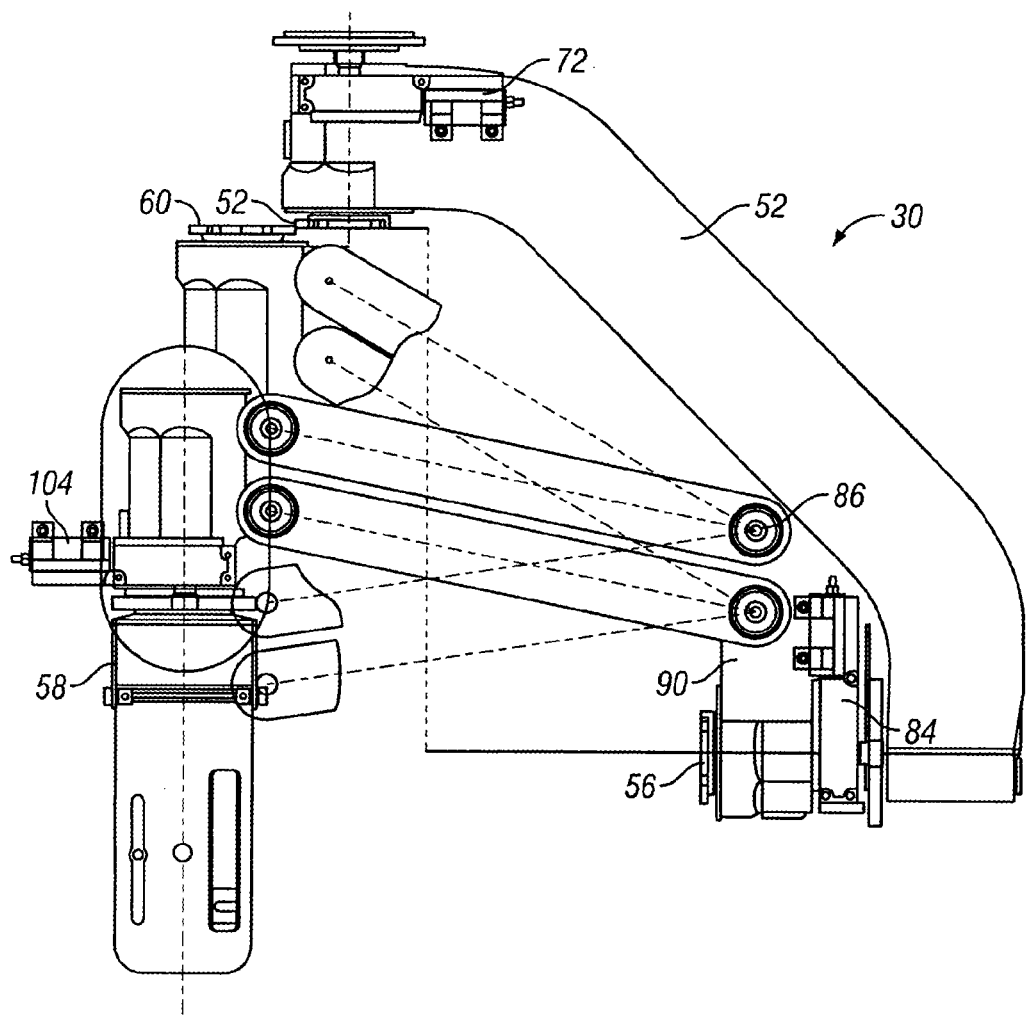
FIG. 7 is a schematically illustrated side view of the present camera support system showing alternative positions.
Figure 15:
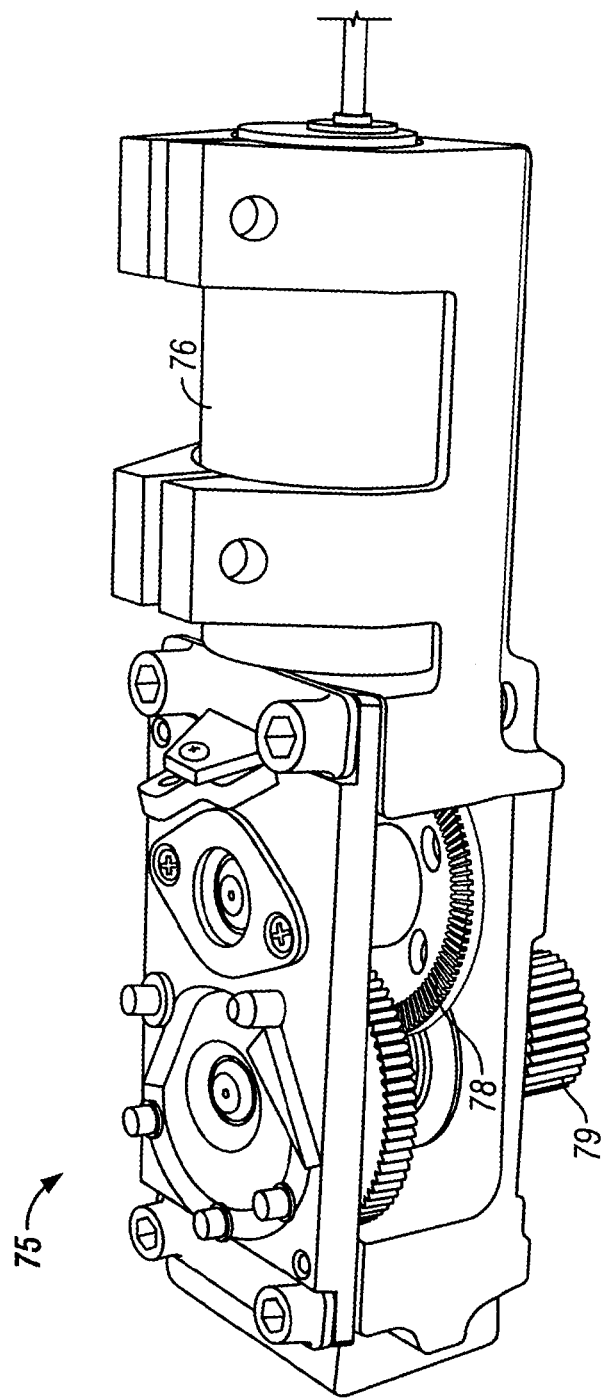
FIG. 15 is a perspective view of a motor assembly as used on the system shown in FIGS. 2-8.

Referring now in addition to FIGS. 4, 5, and 6, a pair of drive motor assemblies 72, 74 is provided to drive the pan frame 50, the roll frame 54, and the tilt frame 58. While the six drive motor assemblies used in the system 30 are preferably the same, to provide a more clear description, each of the motors is separately referred to and numbered based on its location and function in the system 30. Referring momentarily to FIG. 15, a drive motor assembly 75 includes an electric motor 76 which drives an output gear 79 through a speed reducing gear train 78.

Referring to FIGS. 2, 3, and especially FIG. 6, the pan shaft 52 is preferably fixed in place (e.g., bolted, welded, etc.) on the support plate 28 and does not pivot or rotate. A pan shaft gear 70 is rigidly attached to or part of the pan shaft 52. The pan shaft gear 70 is preferably located within the pan frame 50, although it may also be external. The pan frame 50 is rotatably supported on the pan shaft 52 via bearings. First and second pan motor assemblies 72 and 74 are attached to the outside of the pan frame 50. The output gear 79 of each of the pan motor assemblies 72 and 74 engages or meshes with the pan shaft gear 70. Consequently, the electric motors 76 of the pan motor assemblies 72 and 74 are positioned to exert torque on the pan frame about the pan axis 51.

A similar design is provided for rotation about the dutch or roll axis 55 and the tilt axis 59. As shown in FIGS. 3 and 5, the dutch or roll shaft 56 is rotatably supported via bearings to the lower end of the pan frame 50. A roll shaft gear 80 is fixed to the pan frame 50. First and second roll axis motors 82 and 84 are attached to the outside of the roll collar 90. The output gear 79 of each of the roll axis motors 82 and 84 is engaged with the roll shaft gear 80. Consequently, the roll axis motors 82 and 84 are positioned to exert torque on the dutch or roll frame 54 about the dutch or roll axis 55.

In a similar way, as shown in FIG. 6, the tilt axis shaft 60 is rotatably supported on bearings in the tilt collar 100 at the front end of the roll frame 54. A tilt shaft gear 102 is irrotatably attached to the tilt collar 100. First and second tilt motor assemblies 104 and 106 are attached to the outside of the tilt collar 100. The output gear 79 of each tilt motor 104 and 106 meshes with the tilt shaft gear 102. Consequently, the tilt motors 104 and 106 are positioned to exert torque on the tilt frame 58 about the tilt axis 59. Each of the motor assemblies described 72, 74, 82, 84, 104, and 106 is preferably the same as the motor assembly 75 shown in FIGS. 15-18. The positions of the motor assemblies and gears, whether inside or outside of the frames, is immaterial to the invention and may be selected based on design choice.

Referring to FIG. 3, by locating the dutch or roll axis motors 82 and 84 on the dutch collar 90, the stabilization system 30 is made more compact and lightweight. As the weight of the system 30 is reduced, it has less inertia. This reduced inertia reduces the torque requirements of the stabilization system. Consequently, the system 30 can have smaller motors, use less electrical power, have less friction, and provide more accurate stabilization. In addition, the placement of the motors 72, 74, 82, 84, 104, and 106 close to the axis of rotation 51, 55, and 59 reduces the angular moment of inertia of the pan frame 50, dutch or roll frame 54, and tilt frame 58, also providing for rapid stabilizing movements.

Preferably, the motor assemblies are powered and controlled by cables or wires extending back from the stabilization system 30 to an electronics box 42 containing circuitry and a power supply. A control panel or box 40 is connected to the electronics box 42 preferably via cables. Alternatively, wireless connections may be used. If desired, slip rings and/or slip-type electrical connectors or fittings can be used to minimize wind-up of the cables.

As shown in FIGS. 4, 5, and 6, to prevent excessive wind-up of the cables, a stopping or limiting mechanism 112 is provided within the system 30 about each of the axis. Typically, the limiting mechanism 112 will allow e.g., only two or three complete 360° revolutions. The limiting device 112 typically includes several interlocking rings, as is well-known in the art. A locking device 114 is also provided for each axis. The locking mechanism 114 is used during storage, shipment, set-up or calibration and locks each of the frames into a zero (or other preset) angle position. The locking mechanisms 114 are generally disengaged when the system 30 is in use.

FIGS. 1-8 show the mechanical design of the system 30 providing various advantages. FIGS. 9-14 show electronic and control designs. While these designs are preferably used in the system 30 shown in FIGS. 1-8, they can also be used in many other types of camera stabilization systems. Conversely, the system 30 shown in FIGS. 1-8 may be used with any of the circuits, features, or control modes shown in FIGS. 9-13, or it may be used with existing control systems.

Manual Aiming System

Figure 12:
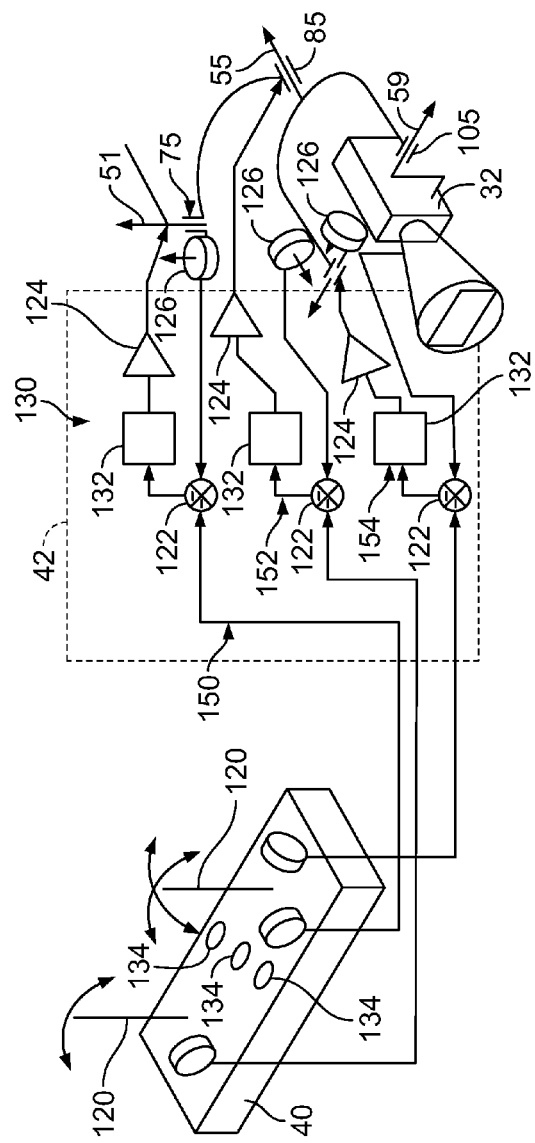
FIG. 12 is a schematic illustration of a camera stabilization system including a manual camera aiming mode function.

Referring to FIG. 12, a camera stabilization system or subsystem 130 includes a manual aiming mode. An adder, mixer, or summator 122, manual control circuit 132, amplifier 124, and sensor 126 is provided in each separate circuit 150, 152 and 154 for control of movement about each of the pan, roll, and tilt axis 51, 55, and 59. The sensor 126 is preferably a rate sensor. Referring to FIG. 12, a separate input control device 120 associated with each of the pan, roll, and tilt axis circuits 150, 152, and 154, provides an input signal to the summator 122. The input control device 120 may be a joystick, control wheel, pedal, mouse, etc.

Figure 13:
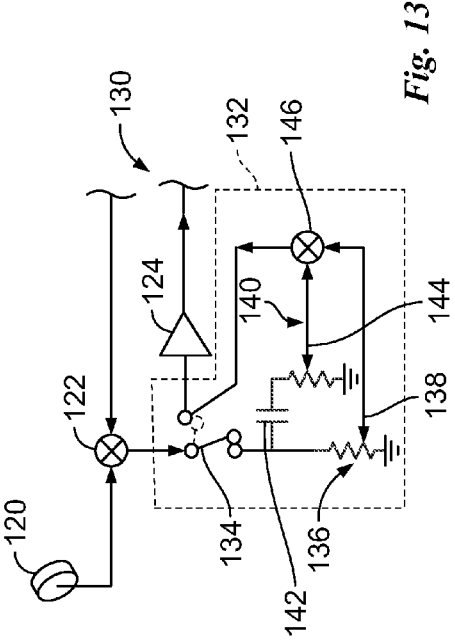
FIG. 13 is a schematic illustration of the manual camera aiming mode circuit used in FIG. 12.

Referring to FIG. 13, the manual aiming circuit 132 is shown within the dotted lines. For the control circuit 150, 152, and 154 associated with movement about each axis 51, 55, and 59, a switch 134 has on and off positions. In the off position, shown in dotted lines in FIG. 13, the manual aiming circuit 132 is disconnected or inactive, and each of the circuits 150, 152, and 154 operates using traditional feedback control. With the switch 134 in the on position, as shown in solid lines in FIG. 13, the manual aiming circuits 132 are active. Each of the manual aiming circuits 132 includes a variable resister 138 forming a divider 136. A capacitor 142 in combination with a second variable resistor 144 forms a differentiator 140. The outputs from the divider 136 and differentiator 140 are added in a manual aiming summator 146. The output from the summator 146 is provided to the amplifier 124. The design of the manual aiming circuit 132 in each of the three axis circuits 150, 152, and 154, are preferably the same.

In use, the switch 134 is switched to the on position, shown in FIG. 13, when the camera operator wants to manually aim the camera 32. This is a common event in film and video production. The camera operator will often want to manually aim the camera (by grabbing and moving the camera platform or the camera itself), for various reasons, such as checking or monitoring a camera angle, field of view, etc. Traditional camera stabilization systems act to resist this type of manual movement, because such intended movement via the hands of the camera operator are indistinguishable from unintended camera movement caused by inertial or gravitational forces associated with movement of the camera crane, motion base, or vehicle supporting the camera, wind loads, etc. With existing systems, when the manual aiming force applied by the camera operators hands exceeds the maximum torque output of the motors, the camera platform suddenly breaks free and can be manually aimed.

This results in an abrupt jerky movement which often overshoots the desired position, with additional time consumed in achieving the desired camera position. Alternatively, the stabilization system can be switched off entirely before manual aiming. However, in either case, smooth camera movement, in a manual mode, is difficult or impossible to achieve. Existing camera stabilization systems either interfere with manual aiming, by automatically resisting such movements until torque limits are exceeded, or, when they are switched off entirely, provide no beneficial control characteristics, with the camera platform moving entirely in response to whatever forces (inertial, gravitational, wind, hand, etc.) may be instantaneously acting on the camera platform. These effects result from the fundamental basic conflicting objectives between a camera stabilization system, which attempts to keep the camera lens aimed at a desired position, regardless of external influences, and manual aiming where the camera operator wants to simply aim the camera manually without interference.

Figure 14:
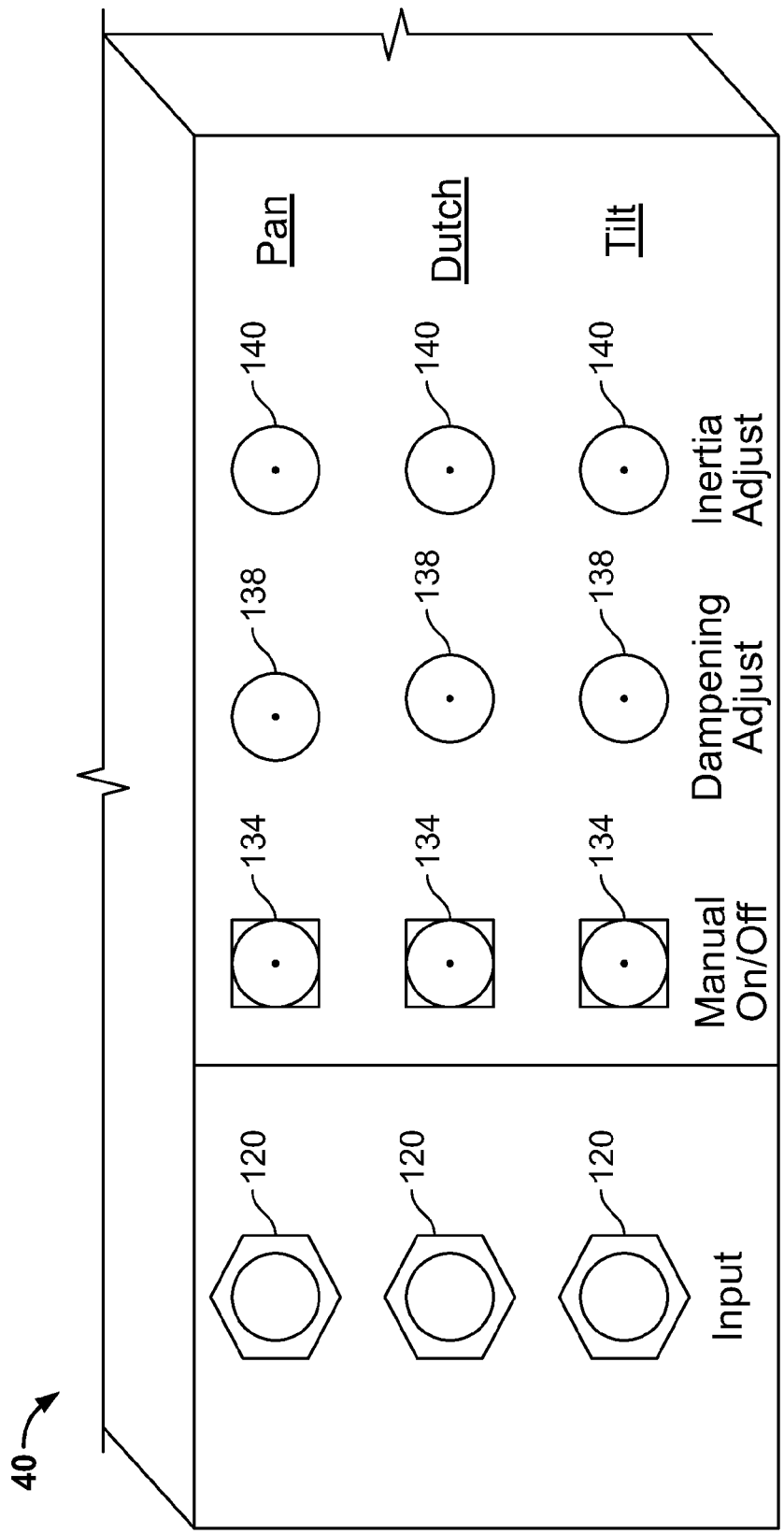
FIG. 14 is a plan view of a control panel for use with the system shown in FIG. 12.

Referring to FIGS. 12, 13, and 14, the divider 138 provides adjustable dampening, and the differentiator 140 provides an adjustable inertia feel, to manual camera aiming movement. Accordingly, the manual aiming circuit 132 provides electronically adjustable inertia and dampening for camera movement in each of the three axes, with inertia and dampening separately adjustable in each axis. Of course, these features may also be used only on a single axis, or on two axes. If all three circuits 150, 152 and 154 are used, they can be individually switched on and off as needed.

FIG. 14 shows an electronics box 42 for use with the manual aiming system 130. Hand controls, such as joysticks on the control box 40, are connected to the electronics box 42. Alternatively, the electronics box 42 and control box 40 may be combined into a single unit, with e.g., joysticks mounted directly on the combined box, as shown in FIG. 12. However, preferably the electronics box 42 is a separate unit provided with inputs from a control panel or box 40 or other remotely located control devices, such as joysticks, wheels, pedals, a mouse, or recorded playback media (tape, CD, etc.). The switches 134 can be separately and independently switched on or off, to provide manual or automatic control. When used, dampening and inertia are preferably adjustable via knobs, dials, etc. 138 and 140 on the control box 40. With the manual aiming circuit 132 switched on, the system 130 provides an adjustable inertia feel to the camera platform. Manual aiming movement of the platform is resisted by the motor assemblies 75 in a way to provide an inertia feel to the camera platform. The circuit 132 controls the motor assemblies 75 based on feedback from the rate sensors 126, in a way so that the camera platform responds to external forces as if the camera payload has a much greater apparent inertia. As a result, during manual aiming, if the inertia levels are turned up using the differentiator 140, even large forces acting on the camera platform will produce slower and smooth movements. This provides for smoother camera platform movement during manual aiming. Similarly, the divider 136 provides adjustable dampening to movement of the camera platform, much like hydraulic dampening, helping to provide smooth camera platform movement even during manual aiming.

In the manual aiming circuit 132, the divider 136 provides control of the motor assemblies 75 to provide resistance to camera platform movement which is proportional to the speed or rate of camera platform movement, i.e., dampening. The differentiator 140 in the manual aiming circuit 132 controls the motor assemblies 175 so that they provide a resistance to camera platform movement which is proportional to acceleration of the camera platform, as detected by the sensors 126 (i.e., inertia). Consequently, to the camera operator, the camera feels and reacts as if the camera is supported on a fluid mounting head.

Drift Compensation

Camera stabilization systems typically use sensors on the camera platform for sensing rate or angular speed. These are typically fiber optic rate sensors. Due to slight inaccuracies in operation of the sensors, virtually all stabilization systems have some degree of drift. Drift is unintentional movement of the camera platform over time. Consequently, over longer periods of time, for example, one hour, the camera position can drift or move, even though the stabilization system is operating properly. As a result, if there is a significant delay in filming or video recording (for example, a lunch break), the camera may drift out of position. If unnoticed, this can result in errors when filming resumes. If the drift of the camera is noticed, it must then be corrected by repositioning the camera. In either even, drift can result in costly loss of production time.

Figure 10:
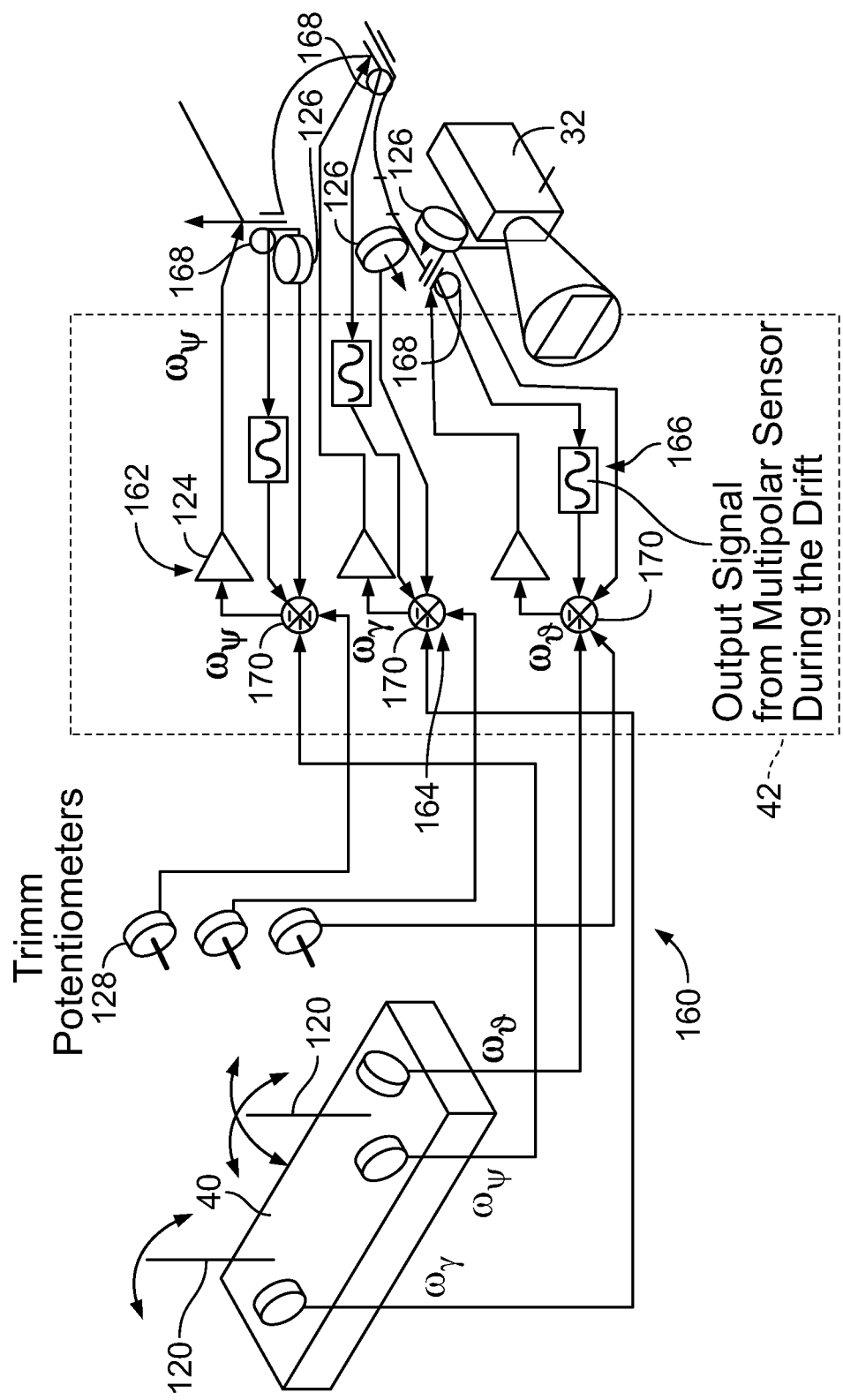
FIG. 10 is a schematic illustration of a drift compensation system.

Referring to FIG. 10, a control system 160 is provided for reducing or eliminating drift. The system 160 includes 3 separate circuits 162, 164, and 166, for controlling drift movement in each of the pan, roll and tilt axes, similar to the system described above in connection with FIG. 12. As shown in FIG. 10, the camera stabilization system with drift control 160 uses conventional gyrostabilization techniques, to provide the stabilization function. Specifically, a rate sensor 126 on the camera platform provides an output to a summator 170. Outputs from trim potentiometers 128 and from a control device 120 are also input to the summator 170. The sum output from the summator 170 is amplified by an amplifier 124 which drives a motor assembly 75, or pair of motor assemblies. This provides feedback gyrostabilization of the camera 32.

To reduce or prevent drift, as shown in FIG. 10, a second sensor 168 is provided to detect movement about each axis. The sensor 168 is a position sensor. For example, the sensor 168 may be an infrared reflective sensor mounted on the pan frame 50 and facing the pan shaft gear 70. In this way, the sensor 168 facing the teeth of the gear 70 can optically detect incremental movement. The output from the drift position sensor 168 is provided into the drift compensation summator 170, and adds to the signals from the control device 120 and trim potentiometer 128. Consequently, the system shown in FIG. 10 having both a rate sensor 126 and a position sensor 168 associated with each pivot axis, is able to provide stabilization and drift control or drift compensation.

The drift position sensor 168 for detecting drift in the roll axis is preferably supported on the roll collar 90 and detects movement optically via the presence or absence of reflected light from the roll shaft gear 80. Similarly, the drift position sensor 168 for detecting drift in the tilt axis is preferably supported on the tilt frame 58 and detects movement optically relative to the tilt shaft gear 102.

Pan Control with Tilt Speed Correction

Figure 11:
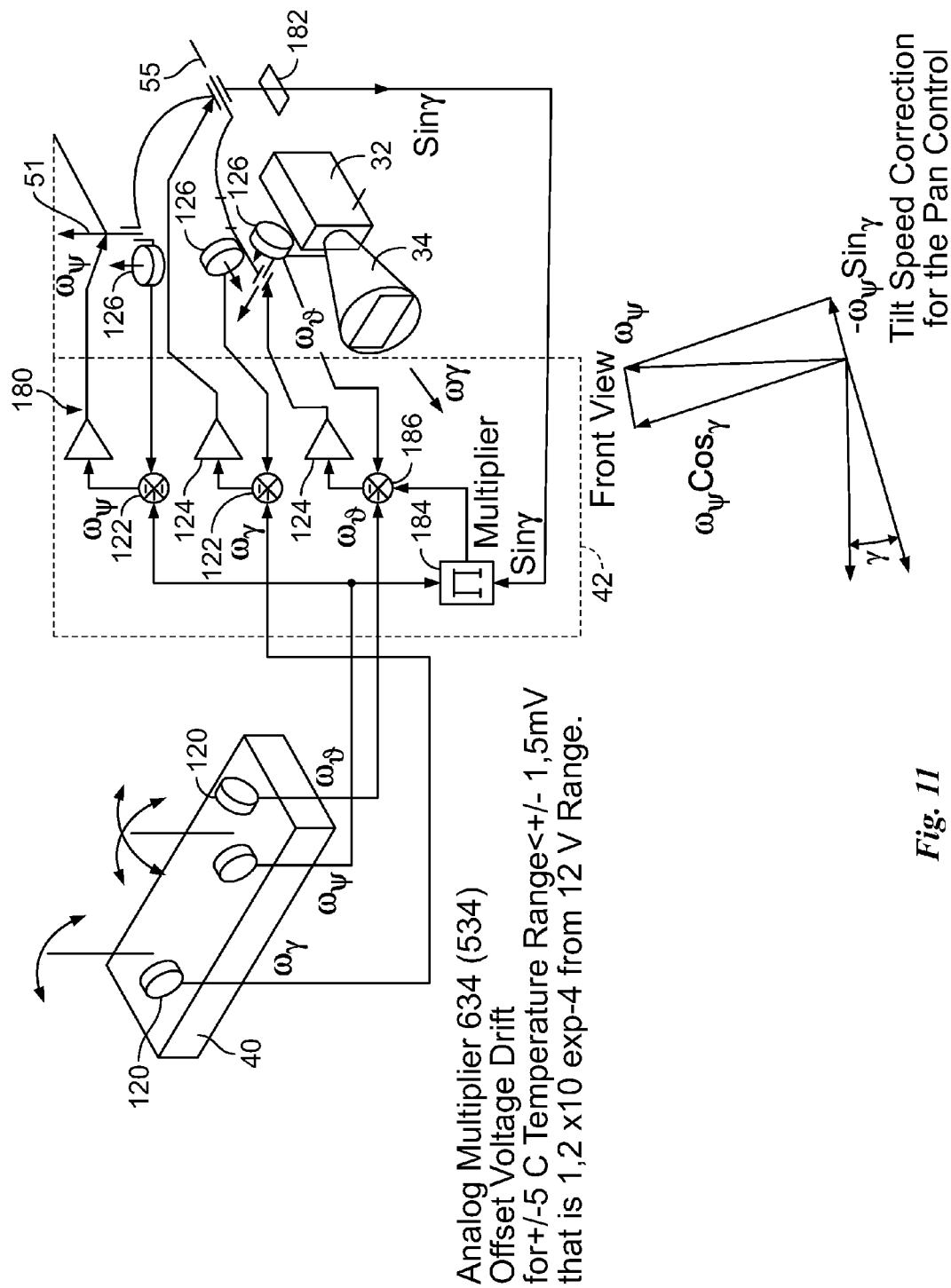
FIG. 11 is a schematic illustration of a control signal distribution system.

Referring to FIG. 11, as the camera platform is pivoted about the roll axis 55, the rate sensor 126 for the pan axis 51 requires trigonometric compensation, since the sensor 126 is no longer horizontal. For example, if the system 30 is positioned as shown in FIG. 3, the pan axis 51 is parallel with the tilt axis 59. In this position, if the camera operator, using a joystick 120 tries to make a panning movement (i.e., to have the pan frame 50 pivot about the pan axis 51), the tilt axis sensor will detect this movement as an unintended deviation from the desired lens position. The system will therefore automatically compensate by pivoting the tilt frame by an equal an opposite amount. The end result is no change in the lens angle, because the manual control of the pan frame is cancelled out by the automatic control of the tilt frame. With the roll frame at any angular position between zero, as shown in FIGS. 2, and 90 degrees, as shown in FIG. 3, the same cancelling of manual pan movement also occurs, although to a lesser extent. For example, with the tilt frame at a angle of 30 degrees (e.g., from horizontal), automatic movement of the tilt frame will be opposite to and one half of pan movement (sine 30=0.5) as input by the camera operator. In the past, achieving desired manual pan movement, against the automatic counteracting movements of the tilt frame, has been left up to the camera operator (via simultaneous manual control of the tilt frame). However, this makes camera operator's job even more difficult. As shown in FIG. 11, a compensated control circuit 180 is provided to overcome this longstanding disadvantage. An output from a roll angle sensor 182 senses the sine roll angle and provides it to a multiplier 184. The pan axis control signal is also provided to the multiplier 184. The output from the multiplier 184 is provided to a correction summator 186, along with the outputs of the tilt axis control device 120 and the tilt axis sensor 126. Accordingly, the output of the sensors 126 is compensated when the camera platform on which the sensors are mounted is positioned at a non-zero roll angle. As a result, regardless of the angular position of the roll frame, all of the frames and the camera pan together.

Automatic Leveling System

With existing camera stabilization systems, in general, a signal from a level sensor on the camera platform provides a reference causing the camera platform to return to level or horizontal, whenever the control signal from the control 120 is zero. For example, if the input control device 120 is a joystick, when the joystick is released and returns to center, the level sensor signal causes the camera platform to return to a zero position about the roll axis. However, the camera operator may want the camera to remain at a non-zero roll angle, even with the control device 120 released and at a zero position.

In addition, if the camera platform is accelerated or decelerated, e.g., at the end of a swinging crane arm, the level sensor signal will not accurately return the camera platform to the zero roll angle, due to inertial effects.

Figure 9:
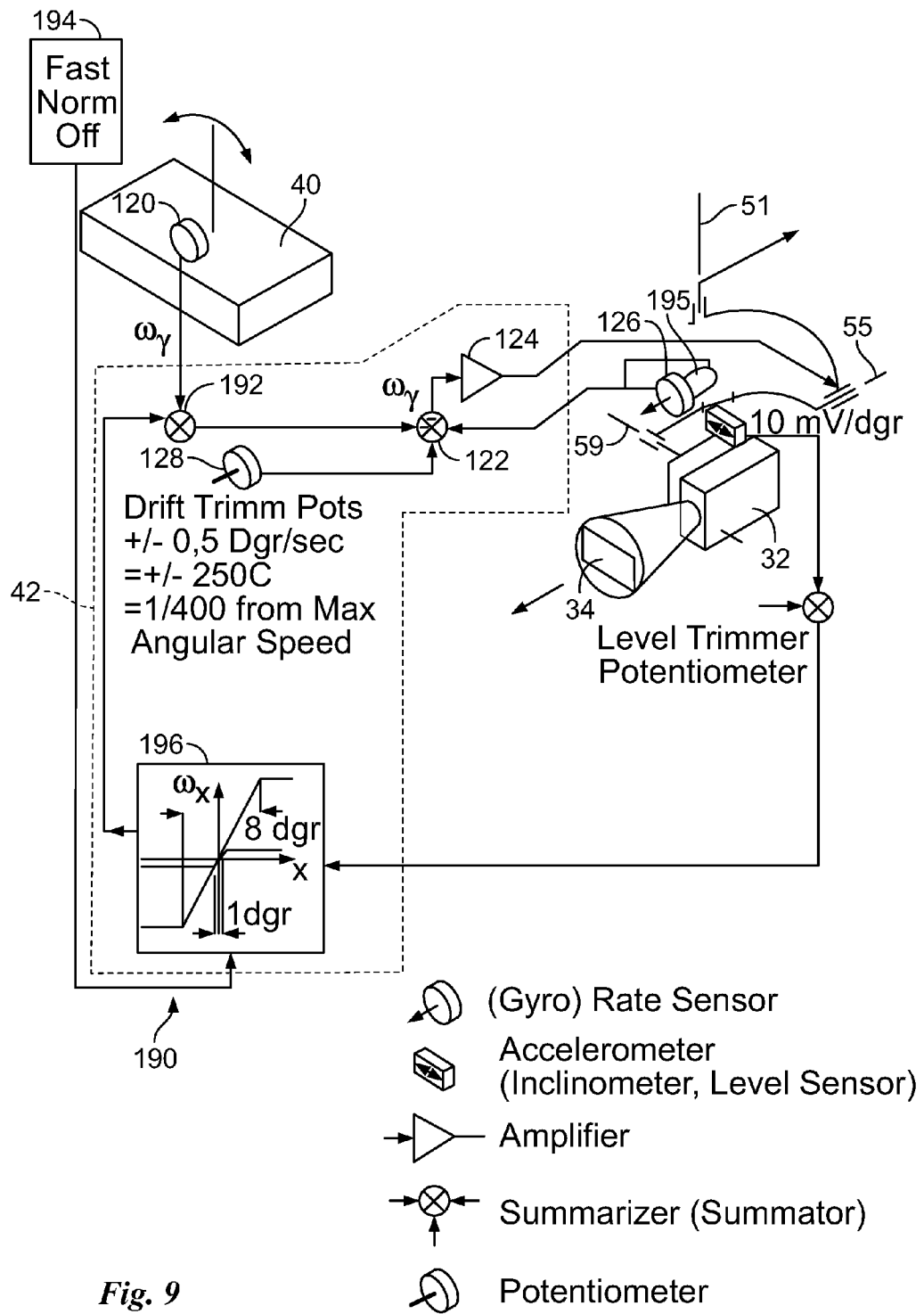
FIG. 9 is a schematic illustration of an automatic leveling system.

Referring to FIG. 9, an automatic leveling system 190 is provided having three modes of operation. The modes of operation are selected using a control panel 40. In the off mode, the system 190 operates using existing techniques. When the control device 120 is moved to a zero or center position and has a zero output, the camera platform remains in whatever roll or dutch angle it is in. In the normal mode of operation, the system 190 operates as described above. That is, when the control device 120 has a zero output (for example, a joystick released), the leveling circuit 196 causes the roll axis motor(s) assembly 75 to return the camera platform to a zero roll angle.

In the fast mode, when the control device 120 has a zero output, the leveling circuit 196 (a switchable/separable amplifier) causes the roll axis motor assemblies 75 to very rapidly return the camera platform to a zero roll angle or horizontal. The fast mode is preferably engaged with a push button, to rapidly level the camera about the roll axis. As shown in FIG. 9, in addition to the roll axis rate sensor 126, there is also a second sensor 195 for sensing position or inclination. In the fast mode, the leveling circuit 196 provides an output which rapidly brings the camera to horizontal (e.g., at 10 degrees/second), about the roll axis, when ever the output signal from the inclination sensor is above a minimum threshold. When the inclination sensor output is below the threshold value, but is not zero, (typically with the inclination sensor sensing an inclination angle or 1,2,3,4 or 5 degrees) the circuit 196 steps down to a second and slower leveling rate, such as ½ degree/second, to avoid overshooting.

Gimbal Balancing

Referring to FIGS. 2-8, the term gimbal refers to the mechanical linkage of the pan, roll and tilt frames and their interconnections. In use, the camera 32 is attached to the tilt frame 54. The vertical position of the tilt frame 54 is adjusted as desired by positioning the vertical or upright arm of the tilt frame 58 in the sleeve 64 and tightening the sleeve bolts 66. The camera is then balanced side to side or laterally on the tilt frame and locked into position via the bolts 65 shown in FIG. 8. Balancing is continued by loosening the roll frame locking bolts 86 and then moving the tilt frame 58 carrying the camera 32 side to side, until there is zero torque acting about the roll axis 55. The roll collar 90 and roll frame 54 are then pivoted 90.degree., from the position shown in FIG. 2 to the position shown in FIG. 3. The center of gravity of payload, i.e., the camera 32 is then again moved from side to side until zero torque results about the roll axis 55. The locking bolts 86 are then tightened.

The camera 32 can then be stabilized using any of the systems, circuits, and techniques described above in connection with FIGS. 9-14. Alternatively, existing known circuits may be used.

In comparison to previous types of systems, the system 30 shown in FIGS. 1-8 provides improved convenience in balancing, has fewer pinch points providing increased safety in use, and is more compact and lightweight.

Referring to FIG. 15, the motor assemblies 75 have gear trains 78 including conical bevel gears. The motor assemblies 75 are compact, to reduce the moments of inertia of the frames supporting them, and to provide a compact design. For providing movement about each axis, the pairs of motors operate on offset amplified signals. The drive signal to each motor is the same, although they are offset from each other. This provides for a linear system and reduces or avoids backlash.

By locating the pan axis motors 72 and 74 on the pan frame 50, and by locating the roll axis motors 82 and 84 on the roll frame 54, the system 30 is made more compact and with less moment of inertia. This allows for more rapid movements. The system 30 is also accordingly more aerodynamically balanced. Consequently, there is less wind load on the system.

Block Switching

During balancing, all motors must be turned off. Accordingly, each time the payload changes, for example, by changing a lens on the camera, power to all motors must be turned off and the system rebalanced. Accordingly, a block power switch 200 controlling power to all motors is preferably provided near the camera, e.g., on the pan frame 50. This allows the assistant camera operator to conveniently turn off power to the motors for balancing. The block power switch 200 preferably controls only power to the motors, and not to the circuitry or sensors.

Thus, novel camera stabilization systems, circuits, and methods have been shown and described. Various changes may of course be made without departing from the spirit and scope of the invention. The invention, therefore, should not be limited, except by the following claims, and their equivalents.

What is claimed is:

1. A camera head, comprising:
    a first frame;
    at least one first motor on or in the first frame, with the first motor having a shaft extending out of the first frame and adapted for attachment to a camera crane, for rotating the first frame about a first axis;

a parallelogram linkage including first and second straight and parallel links having equal lengths, with each of the links having a first end and a second end;

a first locking bolt on a first locking bolt axis attaching the first end of the first link to a first side of the first frame;

a second locking bolt on a second locking bolt axis attaching the first end of the second link to a second side of the first frame, with the first locking bolt axis spaced apart from the second locking bolt axis by dimension D;

with the first and second locking bolts movable from a lock position wherein the first and second links are rigidly attached to the first frame, to an unlock position wherein the first and second links are pivotally attached to the first frame;

a second frame;

a camera platform supported on the second frame at a first side of the second frame, with the camera platform rotatable relative to the second frame about a second axis perpendicular to the first axis;

a third locking bolt on a third locking bolt axis attaching the second end of the first link to the second frame;

a fourth locking bolt on a fourth locking bolt axis attaching the second end of the second link to the second frame; with the third locking bolt axis spaced apart from the fourth locking bolt axis by dimension D, and with the first, second, third and fourth locking bolt axes parallel to each other and perpendicular to the first axis and to the second axis;

at least one second motor on or in the second frame for rotating the camera platform about the second axis;

with the third and fourth locking bolts movable from a lock position wherein the first and second links are rigidly attached to the second frame, to an unlock position wherein the first and second links are pivotally attached to the second frame.

2. The camera head of claim 1 with the camera platform movable towards and away from the second axis, to allow a payload on the camera platform to be centered on the second axis.

3. A camera head comprising:

a first frame;

a first motor on or in the first frame for rotating the first frame about a first axis;

a parallelogram linkage including first and second parallel links, with each link having a first end and a second end;

first and second pivot joints offset to one side of the first axis and pivotally attaching the first ends of the first and second links to the first frame, with the first pivot joint spaced apart from and not co-axial with the second pivot joint;

a second frame;

a camera platform supported on the second frame with the camera platform rotatable about a second axis relative to the second frame;

third and fourth pivot joints attaching the second ends of the first and second links to the second frame, with the third pivot joint spaced apart from and not co-axial with the fourth pivot joint, and with the spacing between the first and second pivot joints equal to the spacing between the third and fourth pivot joints;

a second motor on or in the second frame for rotating the camera platform about the second axis;

a first end locking device movable from a lock position wherein the first end of at least one of the links is rigidly fixed to the first frame, to an unlock position wherein the first end is free to pivot on the first frame; and a second end locking device movable from a lock position wherein the second end of at least one of the links is rigidly fixed to the second frame, to an unlock position wherein the second end is free to pivot on the second frame.

\* \* \* \* \*